Figure 1:
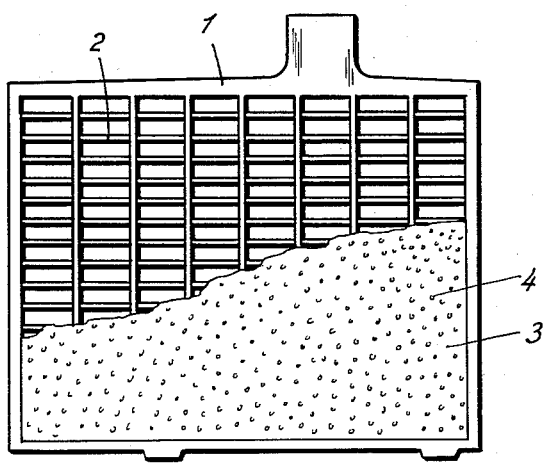

Sept. 13, 1960 W. ILGE ET AL 2,952,726
STORAGE BATTERIES
Filed Dec. 3, 1957

INVENTORS
Wilhelm Ilge    Werner Herrmann
Willy Hausmann  Eugen Mauch
Hans Rittner    Georg Rubach by: Michael S. Striker
Attorney

United States Patent Office 2,952,726
Patented Sept. 13, 1960

2,952,726

STORAGE BATTERIES

Wilhelm Ilge, Stuttgart-Sillenbuch, Werner Herrmann and Willy Haussmann, Stuttgart, Eugen Mauch, Esslingen, Hans Rittner, Stuttgart, and Georg Kubach, Hildesheim, Germany, assignors to Robert Bosch G.m.b.H., Stuttgart, Germany Filed Dec. 3, 1957, Ser. No. 700,387

Claims priority, application Germany Dec. 8, 1956

16 Claims. (Cl. 136—65)

The present invention relates to storage batteries, and more particularly to storage batteries of the well-known lead-sulphuric acid type with electrode plates the grids of which consist of a lead-antimony alloy. Most particularly the invention is concerned with methods of and means for reducing the content of chemical reactive antimony in the electrolyte and on the surface of the negative plates of said storage batteries, in order to obtain a low degree of self-discharge.

The known lead-acid storage batteries lose about 0.5–1% per day of their stored energy when standing in non-discharging condition as a result of self-discharge. Consequently, even after complete charging of the battery the same remains stable only for a relatively short period of time and must often be recharged in order to prevent premature destruction of the plates.

Consequently, charged plates of storage batteries which are not being used can only be formed and stored for a long time in dry condition.

The cause of self-discharging has been found to be mainly due to the antimony ions leaving the lead-antimony alloy of the positive plate grids under the influence of the electrolyte and the charging operation. Such antimony ions migrate to the cathode of the battery and occur in metallic form on the surface of the negative plates, where they form local elements together with the active lead mass.

Attempts have been made to avoid these difficulties by substituting another metal such as calcium instead of the antimony as alloying constituent of the metal to be formed into the grids. Such alloys, however, present considerable technological difficulties with respect to the formation of grids for electrode plates particularly with respect to the formation of combinations of a plurality of plate grids into a complete set of plates. Therefore, as a practical matter the use of antimony alloys has remained and practically only antimony alloys are used commercially.

Attempts have also been made to coat the grid consisting of the lead-antimony alloys, particularly in the portion thereof which projects above the liquid surface of the acid with lead-free and acid-resistant metal coatings. However, this requires an additional production step of forming special layers of chemically pure lead either electrolytically or mechanically on the grid plates before setting of the active mass thereon, and this is of course relatively expensive. Therefore, this means of solving the problem is not successful commercially.

It is therefore a primary object of the present invention to provide storage battery electrode plates in which the grids are formed of lead-antimony alloys wherein a minimum of self-discharge occurs.

It is another object of the present invention to provide grids of storage battery electrode plates which although the grids are formed of lead-antimony alloys nevertheless avoid all of the above set forth disadvantages of the known lead-antimony alloy grids.

It is still another object of the present invention to provide storage batteries in which there is a minimum of antimony content in the surface layers of the grid alloy of the positive electrode and wherein metallic antimony which left the positive plate grids during operation is prevented from local action when deposited on the surface of the negative electrode plates.

It is a further object of the present invention to provide for the incorporation of additives into the active electrode mass of the negative electrode in order to obtain the absorption of antimony and to obtain a chemical reaction of said additives with free metallic antimony deposited on the negative electrode plates.

It is still a further object of the present invention to provide a method of and means for reducing the antimony content of the surface layer of a lead-antimony alloy grid of a storage battery plate.

It is yet a further object of the present invention to provide various means for reducing the antimony content in the surface layer of a grid formed of a lead-antimony alloy which methods can be carried out either before the active electrode material is applied or after its application.

Other objects and advantages of the present invention will be apparent from a further reading of the specification and of the appended claims.

With the above objects in view, the present invention mainly consists in a method for reducing the content of chemically active antimony in storage batteries in which the grids are made of a lead-antimony alloy and in which the content of antimony of the surface layer portions of the grids generally is very much higher than the content of antimony of the interior portions of the grids.

In accordance with a preferred embodiment of the present invention the antimony contents in the surface layer portions of the positive electrode plates are reduced and the negative electrode plates are pasted with an active electrode mass mixed with additives which act against self-discharge by binding metallic antimony deposited during operation on the negative electrode plates.

Any common active electrode masses can be utilized for the positive and negative electrodes. For example, pastes resulting from the mixing of lead oxide or a blend of oxides with a dilute solution of sulphuric acid, superite, pastes consisting of 20% lead oxide and 80% lead sulphate, lead sulphate pastes made from lead sulphate mixed with ammonium hydroxides, etc.

It is preferred to add particles of a pulverulent artificial resin to the active electrode mass of the negative plates in order to prevent the formation of metallic antimony bodies on the surface of the negative plates. Phenol formaldehyde or cresol formaldehyde resins are particularly suitable for this purpose, these resins binding antimony ions which are freed from the grids during operation.

In accordance with another embodiment of the present invention the antimony ions which are freed from the positive plates upon charging of the batteries are rendered harmless by incorporating into the active electrode mass, preferably of the negative plates, about 0.1% by weight of polymers of isoprene or isoprene derivatives in liquid form having a maximum degree of polymerization of 100. Such additives act as catalyst to promote the formation of gaseous antimony hydride which for the most part escape from the battery through the gas canals.

Figure 2:
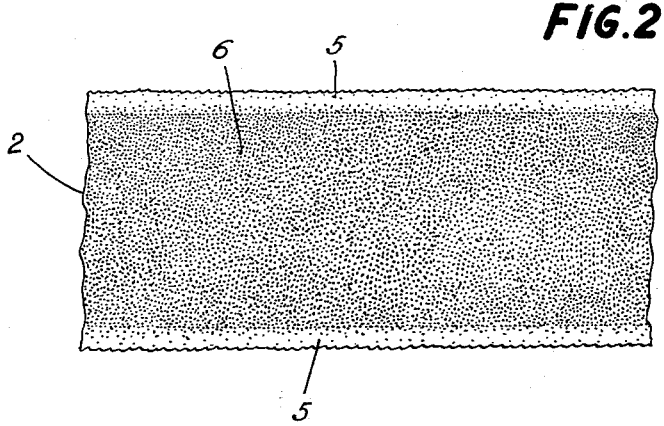

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional view partly broken away of an electrode plate in accordance with the present invention, and Fig. 2 is a sectional view of a grid wire having a reduced antimony content at the surface.

Referring more particularly to the drawings an electrode plate 1 is formed of a wire grid 2. The active electrode mass 3 in the form of a paste has in accordance with the preferred embodiment of the present invention particles of pulverulent phenol formaldehyde or cresol formaldehyde resin 4 incorporated therein. Instead of this resin a liquid polymer of isoprene or isoprene derivative may be incorporated in the active electrode paste 3.

Fig. 2 illustrates by cross section a wire of the grid 2. As shown in Fig. 2 the surface layers 5 of the grid wire have lower antimony contents than the interior portion 6 thereof.

In accordance with one embodiment of the present invention the reduction in the antimony content of the surface layers of a cast grid plate can be accomplished by corroding the surface layer with concentrated sulphuric acid. The present invention provides for the casting of the grid with a lead-antimony alloy containing the normal sufficient amount of antimony, for example 5–12%, to aid in the casting of the grid and to add mechanical strength to the grid. This permits ease of manufacture of the casted grids. It is only after the grid is cast that the same is treated, for example by immersion in concentrated sulphuric acid, to reduce the antimony content of the surface layer only thereof.

According to another embodiment of the present invention the casted lead-antimony alloy grid is subjected to an electrolytic treatment which results in the formation of nascent hydrogen which reacts with the antimony at the surface of the grid to form gaseous antimony hydride, thereby reducing the antimony content of the surface of the grid. According to another embodiment the grid is subjected to a glow discharge treatment which likewise results in the formation of gaseous antimony hydride which escapes from the grid and thereby lowers the antimony content of the surface layer thereof.

It is also possible to cause migration of the antimony out of the surface of the grid by immersing the finished plate, that is the grid together with the coating of active mass into sulphuric acid having sufficiently high concentration to remove the antimony ions from the surface of the grid. This electrode plate may then be removed from the sulphuric acid and incorporated into a storage battery as the positive electrode thereof.

Still another way of reducing the tendency toward self-discharge by keeping the antimony which is freed during the formation of the positive plate out of the battery is to subject the positive plate to a high current, at least during a first stage of the formation process, opposite an auxiliary electrode which can later be removed and substituted by the negative plates of the battery.

By means of any of the above set forth methods, or any combination thereof, it is possible to completely avoid the formation of antimony bodies on the grids which could reach the electrolyte and cause self-discharge. Thus, the tendency toward self-discharge is greatly reduced in accordance with the present invention.

The following example is given to further illustrate the present invention, the scope of the invention not, however, being limited to the specific details of the example.

*Example*

A grid for a Faure or pasted plate is cast from a lead antimony alloy containing 8% of antimony. It has been found that the antimony content in the surface layers of the cast grid is generally several times higher than the antimony content of the inner portions of the grid. This undesired concentration of antimony particles may attain 50% or more just at the surface. In order to corrode the upper layer the cast grid is immersed in 65% sulphuric acid for about five minutes. The grid is then removed and washed. Crystalographic examination shows that the treated surface is completely free and a layer of about 0.02 mm. thickness is substantially free of antimony particles. This grid after being pasted with active electrode mass is used preferably as positive plate of a storage battery.

It will be understood that each of the elements and means described above, or two or more together, may find a useful application in all types of storage batteries, the grids of which are made of lead-antimony alloys.

Preferably the cast grids without mass are immersed in sulphuric acid of 50–90% concentration for about 10–1 min. respectively. For the treatment of complete plates consisting of grids pasted with active mass the suitable acid concentration should be 20–50% and the time of this treatment may be extended to one or two hours.

For the reduction of the antimony content in the surface layer of the grids by electrolytic treatment a current of high intensity e.g. 1–2 amp./dm.$^2$ is most suitable, however the treatment is not limited to sulphuric acids but other well known electrolytes may be used as well, with the exception of those which may attack the lead portions of the grid alloy.

The glow discharge treatment is performed in a closed discharge chamber under a hydrogen atmosphere in a vacuum of about $10^{-3}$ kg./cm$^2$. The lead antimony grids serve as electrodes of a glow discharge under an A.C. voltage of several hundred volts during about 10 minutes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storage battery electrode plate, in combination, a grid comprising a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the proportion of antimony of said interior portion of said grid.

2. In a storage battery, in combination, a positive electrode plate comprising positive active electrode mass and a grid formed with a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the proportion of antimony of said interior portion of said grid; and a negative electrode plate comprising negative active electrode mass and a grid consisting essentially of a lead-antimony alloy throughout the thickness thereof, said negative active electrode mass of said negative electrode including additives which act against the formation of metallic antimony on said negative electrode plate.

3. In a storage battery, in combination, a positive electrode plate comprising positive active electrode mass and a grid formed with a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the predetermined proportion of antimony of said interior portion of said grid; and a negative electrode plate comprising negative active electrode mass and a grid consisting of a lead-antimony alloy throughout the thickness thereof, said negative active electrode mass of said negative electrode including particles of a pulverulent artificial resin which acts against the formation of metallic antimony on said negative electrode plate.

4. In a storage battery, in combination, a positive electrode plate comprising positive active electrode mass and a gird formed with a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the predetermined proportion of antimony of said interior portion of said grid; and a negative electrode plate comprising negative active electrode mass and a grid consisting of a lead-antimony alloy throughout the thickness thereof, said negative active electrode mass of said negative electrode including particles of a pulverulent artificial resin selected from the group consisting of phenol-formaldehyde and cresol-formaldehyde resins which acts against the formation of metallic antimony on said negative electrode plate.

5. In a storage battery, in combination, a positive electrode plate comprising positive active electrode mass and a grid formed with a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the predetermined proportion of antimony of said interior portion of said grid; and a negative electrode plate comprising negative active electrode mass and a grid consisting of a lead-antimony alloy throughout the thickness thereof, said negative active electrode mass of said negative electrode including a liquid polymer selected from the group consisting of polymeric isoprene and isoprene derivatives which acts against the formation of metallic antimony on said negative electrode plate.

6. In a storage battery, in combination, a positive electrode plate comprising positive active electrode mass and a grid formed with a surface layer portion and an interior portion and consisting of a lead-antimony alloy throughout the thickness thereof, said surface layer portion having a predetermined proportion of antimony and said interior portion having a predetermined proportion of antimony, the predetermined proportion of antimony of said surface layer portion of said grid being substantially less than the predetermined proportion of antimony of said interior portion of said grid; and a negative electrode plate comprising negative active electrode mass and a grid consisting of a lead-antimony alloy throughout the thickness thereof, said negative active electrode mass of said negative electrode including about 0.1% by weight of a liquid polymer selected from the group consisting of polymeric isoprene and isoprene derivatives having a maximum degree of polymerization of 100 which acts against the formation of metallic antimony on said negative electrode plate.

7. In the production of storage batteries, the formation of a grid consisting of a lead-antimony alloy throughout the thickness thereof and wherein the surface layer of the grid has a reduced antimony content, which comprises treating the surface of a grid consisting of a lead-antimony alloy of a predetermined antimony content sufficient to permit easy casting of said grid with concentrated sulphuric acid until a predetermined substantial portion of the antimony content of said surface layer has been removed so as to reduce the antimony content of the surface layer of said grid while retaining a lead-antimony alloy in said surface layer, thereby forming a lead-antimony grid having a reduced content of antimony at the surface thereof.

8. In the production of storage batteries, the formation of a grid consisting of a lead-antimony alloy throughout the thickness thereof and wherein the surface layer of the grid has a reduced antimony content, which comprises subjecting a grid consisting of a lead-antimony alloy of a predetermined antimony content sufficient to permit easy casting of said grid to electrolytic treatment whereby nascent hydrogen is formed at the surface of said grid, said nascent hydrogen reacting with the antimony contained in the surface layer of said grid to form gaseous antimony hydride which escapes from said grid, said electrolytic treatment being continued until a predetermined substantial portion of the antimony content of said surface layer has been removed while retaining a lead-antimony alloy in said surface layer, thereby forming a lead-antimony grid having a reduced content of antimony at the surface thereof.

9. In the production of storage batteries, the formation of a grid consisting of a lead-antimony alloy throughout the thickness thereof wherein the surface layer of the grid has a reduced antimony content, which comprises subjecting a grid consisting of a lead antimony alloy of a predetermined antimony content sufficient to permit easy casting of said grid to a glow discharge treatment in the presence of hydrogen so as to form gaseous antimony hydride of the antimony contained in the surface layer of said grid, said gaseous antimony hydride escaping from said grid, said electrolytic treatment being continued until a predetermined substantial portion of the antimony content of said surface layer has been removed while retaining a lead-antimony alloy in said surface layer, thereby forming a lead antimony grid having a reduced content of antimony at the surface thereof.

10. In the production of storage batteries, the formation of a grid consisting of a lead-antimony alloy throughout the thickness thereof wherein the surface layer of the grid has a reduced antimony content, which comprises immersing an electrode plate comprising active electrode mass and a grid consisting of a lead-antimony alloy of sufficient antimony content to permit easy casting of said grid into sulphuric acid of sufficient concentration to attack the antimony of the surface layer of said grid until a predetermined substantial portion of the antimony content of said surface layer has been removed so as to reduce the antimony content of the surface layer of said grid while retaining a lead-antimony alloy in said surface layer, thereby forming a lead-antimony grid having a reduced content of antimony at the surface thereof.

11. In the production of storage batteries, the formation of a grid consisting of a lead-antimony alloy throughout the thickness thereof wherein the surface layer of the grid has a reduced antimony content, which comprises immersing an electrode plate comprising active electrode mass and a grid consisting of a lead-antimony alloy of sufficient antimony content to permit easy casting of said grid into sulphuric acid of sufficient concentration to attack the antimony of the surface layer of said grid until a predetermined substantial portion of the antimony content of said surface layer has been removed so as to reduce the antimony content of the surface layer of said grid while retaining a lead-antimony alloy in said surface layer, thereby forming a lead-antimony grid having a reduced content of antimony at the surface thereof; removing said electrode plate from said sulphuric acid; and incorporating said electrode plate as the positive electrode of a storage battery.

12. In the production of storage batteries, the formation of a grid consisting of a lead-antimony alloy throughout the thickness thereof wherein the surface layer of the grid has a reduced antimony content, which comprises subjecting a positive electrode plate comprising positive electrode mass and a grid consisting of a lead-antimony alloy of sufficient antimony content to permit easy casting of said grid to high current opposite an auxiliary electrode until a predetermined substantial portion of the antimony content of said surface layer has been removed so as to reduce the antimony content of the surface layer of said grid while retaining a lead-antimony alloy in said surface layer, thereby forming a lead-antimony grid having a reduced content of antimony at the surface thereof.

13. In a storage battery electrode plate, in combination, a grid comprising a surface layer portion and an interior portion and consisting of a lead-antimony alloy of about 5–12% antimony throughout the thickness thereof, said surface layer portion having a predetermined proportion of antimony and said interior portion having a predetermined proportion of antimony, the predetermined proportion of antimony of said surface layer portion of said grid being substantially less than the predetermined proportion of antimony of said interior portion of said grid.

14. In the production of storage batteries, the formation of a grid consisting of a lead-antimony alloy throughout the thickness thereof and wherein the surface layer of the grid has a reduced antimony content, which comprises treating the surface of a grid consisting of a lead-antimony alloy of an antimony content of 5–12% which permits easy casting of said grid with concentrated sulphuric acid until a predetermined substantial portion of the antimony content of said surface layer has been removed so as to reduce the antimony content of the surface layer of said grid while retaining a lead-antimony alloy in said surface layer, thereby forming a lead-antimony grid having a reduced content of antimony at the surface thereof.

15. In the production of storage batteries, the formation of a grid consisting of a lead-antimony alloy throughout the thickness thereof and wherein the surface layer of the grid has a reduced antimony content, which comprises subjecting a grid consisting of a lead-antimony alloy of an antimony content of 5–12% which permits easy casting of said grid to electrolytic treatment whereby nascent hydrogen is formed at the surface of said grid, said nascent hydrogen reacting with the antimony contained in the surface layer of said grid to form gaseous antimony hydride which escapes from said grid, said electrolytic treatment being continued until a predetermined substantial portion of the antimony content of said surface layer has been removed while retaining a lead-antimony alloy in said surface layer, thereby forming a lead-antimony grid having a reduced content of antimony at the surface thereof.

16. In the production of storage batteries, the formation of a grid consisting of a lead-antimony alloy throughout the thickness thereof wherein the surface layer of the grid has a reduced antimony content, which comprises subjecting a grid consisting of a lead-antimony alloy of an antimony content of 5–12% which permits easy casting of said grid to a glow discharge treatment in the presence of hydrogen so as to form gaseous antimony hydride of the antimony contained in the surface layer of said grid, said gaseous antimony hydride escaping from said grid, said electrolytic treatment being continued until a predetermined substantial portion of the antimony content of said surface layer has been removed while retaining a lead-antimony alloy in said surface layer, thereby forming a lead antimony grid having a reduced content of antimony at the surface thereof.

References Cited in the file of this patent

UNITED STATES PATENTS

| | | |
|---|---|---|
| 2,076,238 | Juman | Apr. 6, 1937 |
| 2,193,782 | Smith | Mar. 12, 1940 |
| 2,282,760 | Hanel | May 12, 1942 |
| 2,677,713 | Weil et al. | May 4, 1954 |